United States Patent
Wee et al.

(10) Patent No.: US 7,590,941 B2
(45) Date of Patent: Sep. 15, 2009

(54) COMMUNICATION AND COLLABORATION SYSTEM USING RICH MEDIA ENVIRONMENTS

(75) Inventors: Susie J. Wee, Palo Alto, CA (US); Henry Harlyn Baker, Los Altos, CA (US); Nina T. Bhatti, Mountain View, CA (US); Michele Covell, Palo Alto, CA (US); Michael Harville, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 146 days.

(21) Appl. No.: 10/682,542

(22) Filed: Oct. 9, 2003

(65) Prior Publication Data

US 2005/0081160 A1 Apr. 14, 2005

(51) Int. Cl.
*G06F 3/00* (2006.01)
*G06F 3/14* (2006.01)

(52) U.S. Cl. .................. 715/753; 715/717; 715/755; 715/863; 348/143; 348/155; 348/159; 725/10; 725/12; 704/231; 382/190

(58) Field of Classification Search ........... 715/700, 715/716, 717, 719, 753, 764, 771, 773, 863, 715/500.1, 501.1, 205, 751, 755, 759, 203; 345/156, 173; 348/143, 155, 159; 379/202.01; 382/190, 209; 725/9, 10, 12; 704/231, 270
See application file for complete search history.

(56) References Cited

U.S. PATENT DOCUMENTS

| | | | |
|---|---|---|---|
| 5,440,624 A | | 8/1995 | Schoof, II |
| 5,686,957 A | * | 11/1997 | Baker .......................... 348/36 |
| 5,717,869 A | * | 2/1998 | Moran et al. ................ 715/716 |
| 5,793,365 A | * | 8/1998 | Tang et al. .................. 715/758 |
| 5,867,654 A | * | 2/1999 | Ludwig et al. ............... 709/204 |
| 6,081,619 A | * | 6/2000 | Hashimoto et al. .......... 382/181 |
| 6,215,890 B1 | * | 4/2001 | Matsuo et al. ............... 382/103 |

(Continued)

FOREIGN PATENT DOCUMENTS

EP 1162815 * 12/2001

(Continued)

OTHER PUBLICATIONS

T. Chang et al, "Tracking multiple people with a multi-camera system", Jul. 2001, IEEE, vi+103 pp.*

(Continued)

*Primary Examiner*—X. L Bautista

(57) ABSTRACT

A system that enables communication and collaboration among individuals using rich media environments. A system according to the present techniques includes a set of rich media environments each having a corresponding arrangement of sensing and rendering components for sensing of and rendering to a corresponding set of individuals. A system according to the present techniques includes an interest thread detector that uses the sensing and rendering components to detect formation of multiple communication interactions among the individuals and that creates an interest thread for each detected communication interaction and further includes a communication provider that for each interest thread captures a set of media data from a corresponding subset of the sensing components and that combines the captured media data in response to the activities of the corresponding individuals and that communicates the combined media data to a corresponding subset of the rendering components.

45 Claims, 9 Drawing Sheets

U.S. PATENT DOCUMENTS

| | | | | |
|---|---|---|---|---|
| 6,256,046 | B1 * | 7/2001 | Waters et al. | 345/473 |
| 6,307,952 | B1 * | 10/2001 | Dietz | 382/107 |
| 6,388,654 | B1 * | 5/2002 | Platzker et al. | 345/156 |
| 6,396,509 | B1 * | 5/2002 | Cheng | 715/706 |
| 6,428,449 | B1 * | 8/2002 | Apseloff | 482/3 |
| 6,559,863 | B1 * | 5/2003 | Megiddo | 715/753 |
| 6,784,901 | B1 * | 8/2004 | Harvey et al. | 715/757 |
| 6,801,637 | B2 * | 10/2004 | Voronka et al. | 382/103 |
| 6,948,131 | B1 * | 9/2005 | Neven et al. | 715/753 |
| 7,106,358 | B2 * | 9/2006 | Valliath et al. | 348/14.08 |
| 2002/0106998 | A1 * | 8/2002 | Presley et al. | 455/403 |
| 2002/0112004 | A1 * | 8/2002 | Reid et al. | 709/205 |
| 2002/0120545 | A1 | 8/2002 | Katz | |
| 2002/0191071 | A1 * | 12/2002 | Rui et al. | 348/14.03 |
| 2003/0001890 | A1 * | 1/2003 | Brin | 345/753 |
| 2003/0112139 | A1 * | 6/2003 | Matsui et al. | 340/500 |
| 2003/0208289 | A1 * | 11/2003 | Ben-Arie | 700/61 |
| 2004/0133081 | A1 * | 7/2004 | Teller et al. | 600/300 |
| 2004/0172252 | A1 * | 9/2004 | Aoki et al. | 704/270 |
| 2004/0172255 | A1 * | 9/2004 | Aoki et al. | 704/275 |
| 2004/0201710 | A1 * | 10/2004 | Uchihashi et al. | 348/211.2 |
| 2004/0258307 | A1 * | 12/2004 | Viola et al. | 382/190 |
| 2005/0012817 | A1 * | 1/2005 | Hampapur et al. | 348/143 |
| 2005/0069116 | A1 * | 3/2005 | Murray | 379/202.01 |

FOREIGN PATENT DOCUMENTS

| | | | |
|---|---|---|---|
| FR | 2649843 | * | 1/1991 |
| GB | 2313250 | | 11/1997 |
| JP | 9070031 | * | 3/1997 |
| JP | 10042264 | * | 2/1998 |
| JP | 2003-224836 | * | 8/2003 |

OTHER PUBLICATIONS

Basil R. Halhed, "MCUs: technology for multipoint videoconferencing", May 1991, Business Communications Review, v21, n p. 72(7).*

T. Arakaki et al, "Development of multipoint teleconference system using multipoint control unit (MCU)", Jan. 1993, Pacific Telecommun. Council, Honolulu, 2 vol. xvi+1064 pp.*

Dave Brown, "Video Calls Within the Walls (and outside too)", Jun. 1997, Network Computing, n810, p. 62.*

H. F. Silverman et al, "An experiment that validates theory with measurements for a large-aperture microphone array", 2001 IEEE, Speech and Siganl Processing-Proceedings, v 5, p. 3029-3032.*

Bill Roberts, "The next best thing to being there: More companies adopt Web-...", Mar. 2002, Electronic Business, v28, n3, p. 42(1).*

F. Kishino et al, "Virtual space teleconferencing: Real-time detection and reproduction of 3D face and body images", Dec. 1995, ATR Communication Syst. Res. Lab., Kyoto, Japan.*

Andrew W. Davis, "Image Recognition and Video Conferencing: A New Role for Vision...", Feb. 2000, Advanced Imaging, v15, n2, p. 30(3).*

Venkat, Rangan P. —"Video Conferencing, File Storage, and Management in Multimedia Computer Systems"—Computer Networks and ISDN Systems vol. 25 No. 8 Mar. 1993 pp. 901-919.

Patent Abstracts of Japan—vol. 2003 No. 10—Fuji Xerox Co Ltd—Oct. 8, 2003.

* cited by examiner

COMMUNICATION AND COLLABORATION SYSTEM USING RICH MEDIA ENVIRONMENTS

BACKGROUND

A video conferencing system may be used to provide communication among conference participants who are distributed among multiple meeting sites. Each meeting site in a video conferencing system may be equipped with video/audio sensing devices and video/audio rendering devices. The video/audio sensing devices may be used to hold communication sessions and to obtain a video/audio recording of a meeting. An obtained video/audio recording may be transferred to a remote meeting site and rendered on the video/audio rendering devices in the remote meeting site.

It may be common for conference participants to split off into side groups for private or focused discussions. Unfortunately, prior video conferencing systems may not facilitate side group communication among participants at different conference sites. For example, the interconnections of the sensing and rendering devices in prior video conferencing systems may permit only one discussion group at a time.

In addition, prior video conferencing system may not enable conference participants located at different meeting sites to collaborate on document creation. A prior video conferencing system may be augmented with a computer-based document sharing system. Unfortunately, document sharing systems may not integrate well into a video conferencing system.

SUMMARY OF THE INVENTION

A system is disclosed that enables communication and collaboration among individuals using rich media environments. A system according to the present techniques includes a set of rich media environments each having a corresponding arrangement of sensing and rendering components for sensing and rendering to a corresponding set of individuals. A system according to the present techniques includes an interest thread detector that uses the sensing and rendering components to detect multiple communication interactions among the individuals and that maintains an interest thread for each detected communication interaction and further includes a communication provider that for each interest thread captures a set of media data from a corresponding subset of the sensing components and that combines the captured media data in response to the activities of the corresponding individuals and that communicates the combined media data to a corresponding subset of the rendering components.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
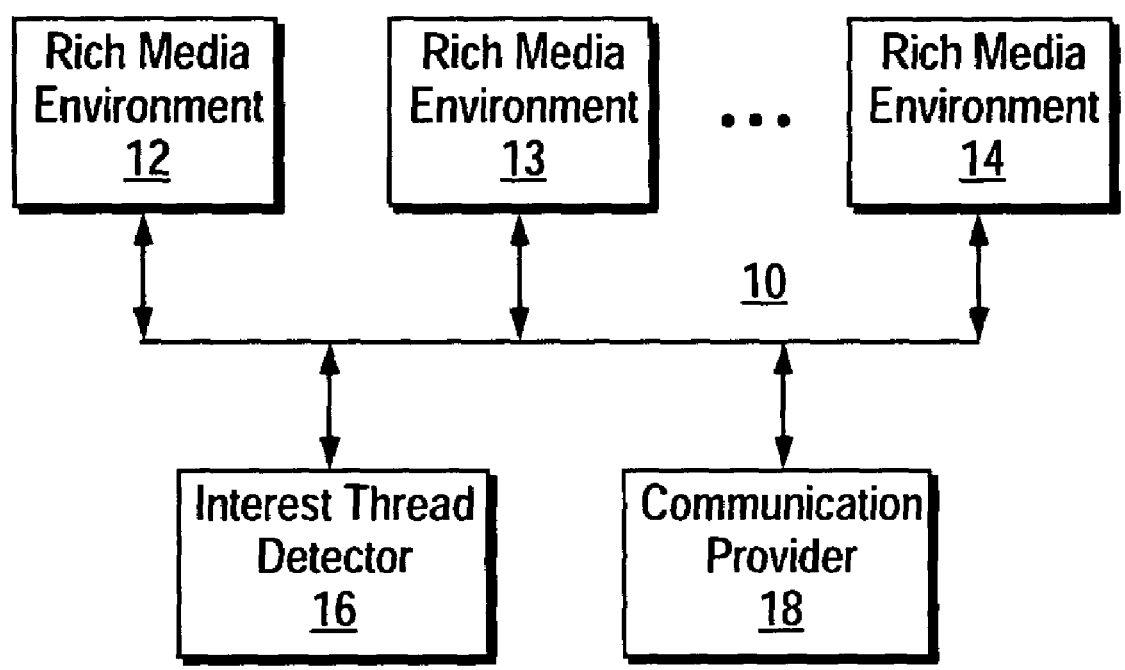
FIG. 1 shows a system according to the present teachings.

FIG. 1 shows a system 10 according to the present teachings. The system 10 includes a set of rich media environments 12-14, an interest thread detector 16 and a communication provider 18. The functions of the interest thread detector 16 and/or the communication provider 18 may be centralized as shown or may be distributed among the rich media environments 12-14.

Each rich media environment 12-14 includes an arrangement of sensing and rendering components. The sensing components in the rich media environments 12-14 may include any assortment of microphones, cameras, motion detectors, etc. Input devices such as keyboards, mice, keypads, touchscreens, etc., may be treated as sensing components. The rendering components in the rich media environments 12-14 may include any assortment of visual displays and audio speakers. The rich media environments 12-14 may be embodied in any contiguous space. Examples include conference rooms, meeting rooms, outdoor venues, e.g. sporting events, etc. Each rich media environment 12-14 preferably includes a relatively large number of sensing and rendering components, thereby enabling flexible deployment of sensing and rendering components onto multiple communication interactions. Hence the term—rich media environment.

The interest thread detector 16 uses the sensing components in the rich media environments 12-14 to detect formation of communication interactions among the individuals in the rich media environments 12-14. The interest thread detector 16 creates an interest thread for each detected communication interaction. The communication provider 18 selects a subset of the sensing and rendering components in the rich media environments 12-14 for use in communicating with the individuals involved in each interest thread and communicates media data among the selected sensing and rendering components in support of each interest thread.

Figure 2:
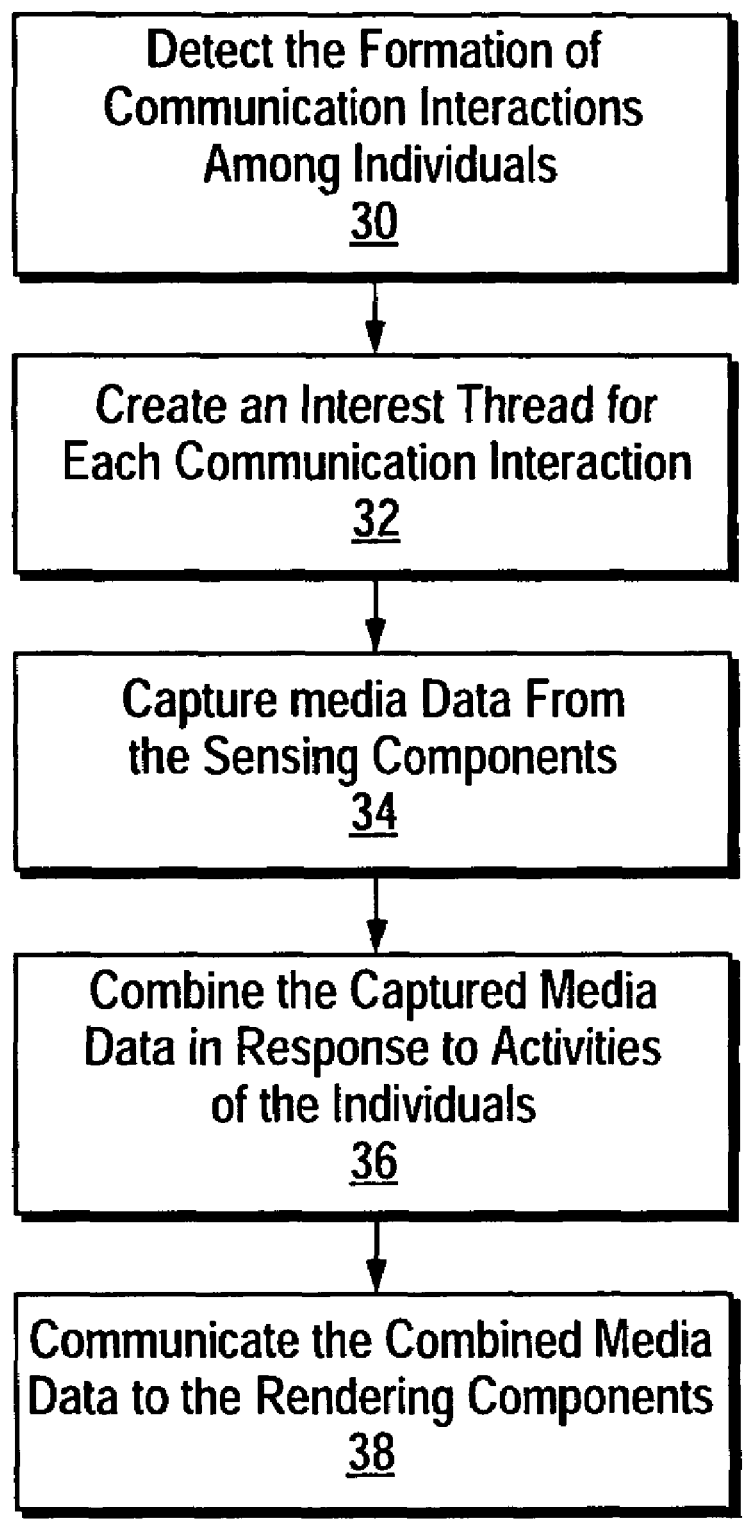
FIG. 2 shows a method for communication using rich media environments.

FIG. 2 shows a method for method for communication using the rich media environments. At step 30, the formation of communication interactions among a set of individuals is detected. At step 32, an interest thread is created for each detected communication interaction.

Figure 3:
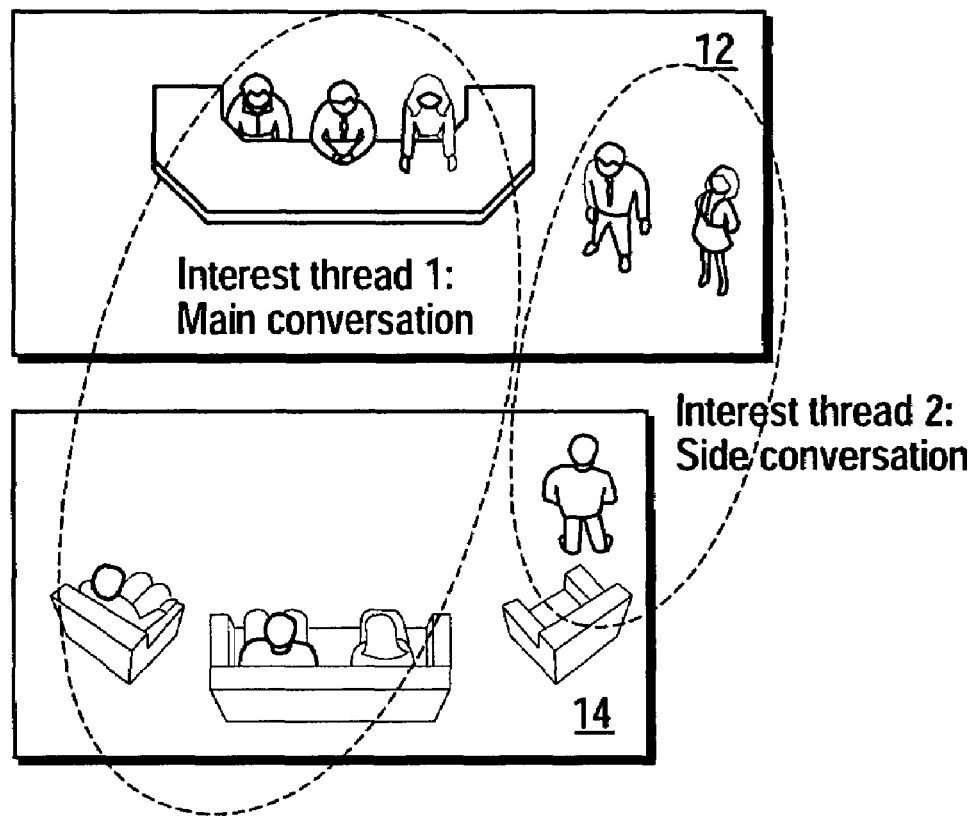
FIG. 3 shows an example of a main conversation and a side conversation between individuals in rich media environments.

FIG. 3 shows an example of a main conversation and a side conversation between individuals in the rich media environments 12 and 14. The interest thread 1 is created for the main conversation and the interest thread 2 is created for the side conversation.

Steps 34-38 are performed for each interest thread. At step 34, a set of media data pertaining to the corresponding interest thread is captured from the sensing components and at step 36 the captured media data is combined in response to the activities of the participating and non-participating individuals in the interest thread. At step 38, the combined media data is communicated to the rendering components for the interest thread.

A communication interaction, i.e. interest thread, may involve individuals in one of the rich media environments 12-14. For example, the interest thread detector 16 may detect a communication interaction between two or more individuals in the rich media environment 12.

A communication interaction may involve individuals in two or more of the rich media environments 12-14. For example, the interest thread detector 16 may detect a communication interaction between an individual in the rich media environment 12 and an individual in the rich media environment 13.

A communication interaction may pertain to an artifact in one of the rich media environments 12-14. An artifact may be defined as anything, e.g. inanimate objects, animals, robotic objects, etc., apart from individuals. For example, the interest thread detector 16 may detect a communication interaction involving a sheet of paper, a white board, or other item of interest in the rich media environment 12. An artifact may be an electronic document that is rendered on a display and that includes a computer-maintained document history.

The interest thread detector 16 may detect formation of a communication interaction by detecting a visual cue, e.g. a gesture, a movement, etc., by one of one or more individuals in the rich media environments 12-14. A visual cue may pertain to another individual in the same rich media environment or may pertain to an individual in another rich media environment. For example, an individual in the rich media environment 12 may point to or approach another individual in the rich media environment 12 and the interest thread detector 16 in response creates an interest thread between those two individuals in the rich media environment 12. In another example, an individual in the rich media environment 12 may point to a visual display in the rich media environment 12 while an individual located in the rich media environment 14 is being rendered on the visual display and the interest thread detector 16 in response creates an interest thread between the individual the rich media environment 12 and the individual in the rich media environment 14.

The interest thread detector 16 may detect a visual cue using machine vision techniques. For example, the sensing components in the rich media environments 12-14 may include digital cameras and the interest thread detector 16 may employ a variety of known machine vision techniques to detect movements, gestures, etc., of individuals. In addition, the sensing components in the rich media environments 12-14 may include microphones and the interest thread detector 16 may employ a variety of known audio processing techniques to detect individuals and movements of the individuals in the rich media environments 12-14.

The interest thread detector 16 may detect formation of a communication interaction by detecting an audio cue, e.g. spoken speech. The interest thread detector 16 may create an interest thread in response to user input via a graphical user interface.

For each interest thread, the communication provider 18 captures a set of media data from a corresponding subset of the sensing components. For each interest thread, the communication provider 18 combines the captured media data in response to the activities of the corresponding individuals and communicates the combined media data to a corresponding subset of the rendering components. The activities that may cause media data to be combined may include the speech levels of the individuals, gestures by the individuals, or movements by the individuals to name a few examples. The communication provider 18 refines the media data obtained from the sensor components in response to the activities. In addition, the communication provider 18 may store the combined media data to provide a history of the corresponding communication interaction.

The communication provider 18 selects a subset of the sensing and rendering components of the rich media environments 12-14 for an interest thread in response to a location of each individual involved in the interest thread and a set of characteristics pertaining to the sensing and rendering component in the rich media environments 12-14. For example, the characteristics of a digital camera may specify its coverage area in a rich media environment, i.e. the areas of the rich media environment that the digital camera is capable of sampling. Similarly, the characteristics of a microphone may specify the areas of a rich media environment that the microphone is capable of sampling and the characteristics of a visual display may specify the areas of a rich media environment that the visual display is capable of reaching. The communication provider 18 may employ machine vision or audio processing techniques to locate the individuals involved in an interest thread and then select sensing and rendering components for that interest thread based on the locations of the individuals involved in the interest thread and the coverage areas of the sensing and rendering components in the rich media environments of those individuals.

The system 10 may include one or more databases for holding records of the characteristics of the sensing and rendering component in the rich media environments 12-14. The communication provider 18 may access the databases when selecting sensing and rendering components for an interest thread.

The communication provider 18 monitors each interest thread and re-selects the sensing and rendering components as needed. For example, the communication provider 18 may detect when one or more of the individuals involved in an interest thread moves out of the coverage areas of the currently selected sensing and rendering components. The communication provider 18 may employ machine vision or audio processing techniques to detect movements of the individual involved in an interest thread. In response, the communication provider 18 selects a new set of sensing and rendering components for the interest thread based on the new locations of the individuals involved in the interest thread and the specified coverage areas of the available sensing and rendering components.

The selection and re-selection of sensing and rendering components for an interest thread may be based on the positions and movements of the individuals that participate in the interest thread and the positions and movements of the individuals that do not participate in the interest thread. For example, adaptive nulling techniques may be used to select rendering components that will exclude non-participating individuals from a private side-conversation.

Figure 4:
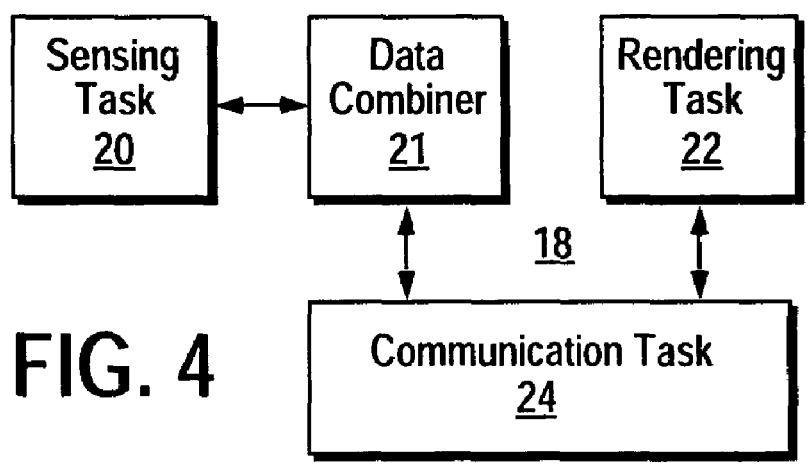
FIG. 4 shows one embodiment of a communication provider.

FIG. 4 shows one embodiment of the communication provider 18. The communication provider 18 in this embodiment includes a sensing task 20, a data combiner 21, a rendering task 22, and a communication task 24. Any one or more of the sensing task 20, that data combiner 21, the rendering task 22, and the communication task 24 may be centralized as shown or be distributed among the rich media environments 12-14.

The sensing task 20 captures sensor data from the sensing components in the rich media environments 12-14 that have been selected for a particular interest thread and extracts a set of data pertaining to the particular interest thread from the captured sensor data. For example, the sensing task 20 may capture sensor data from a selected microphone and then use audio processing techniques to extract the voices of individuals involved in the particular interest thread. In another example, the sensing task 20 may capture sensor data from a selected digital camera and use machine vision techniques to extract images of individuals involved in the particular interest thread. The sensing task 20 may employ pan and zoom functions of digital cameras to capture visual data of the relevant individuals.

The data combiner 21 obtains sensor data from sensing task 20, analyzes the video content and combines the captured video in order to select the best view or views of the individuals or artifacts or areas of interest. Any of a variety of known methods for tiling, overlapping, compositing, or otherwise combining videos, may be used to combine multiple simultaneous videos sources that are to be rendered on a single display. The data combiner 21 selects which video streams to combine at any given moment by audio analysis, motion analysis, gaze analysis, or gesture analysis.

For example, the best camera view or views may be selected according to any of the following techniques. If the audio level measured by a microphone is higher than that of all others, then the camera view that covers the visible region around that microphone may be selected. When a speech/noise discriminator classifies an audio input as speech, then the view of the individual nearest that microphone whose mouth and jaw are moving may be selected. When the measurement of motion level (e.g. via frame differencing) within the content being captured by a camera is high, the view containing that motion may be selected. When an individual who is believed to be speaking is pointing at another part of a rich media environment, then the view that best aligns with the direction of their gesture may be selected. When multiple individuals are all gazing in the same direction, then the view that best contains the intersection of those gaze directions may be selected.

The data combiner 21 may automatically refine the views captured by cameras in the rich media environments 12-14 to display the individuals or artifacts or areas of interest more clearly. For example, video-based face detection, motion detection, and skin-color detection methods may be used to digitally zoom, center, and/or crop the view to better focus the camera on the individuals with which it is associated. The zooming, centering, and cropping parameters may be allowed to vary dynamically during the course of the meeting if tracking methods are used to monitor the position of the individuals in the camera field-of-view.

Similarly, the data combiner 21 analyzes and combines the audio captured by the microphones in order to select the best audio representation. When multiple simultaneous microphone recordings are combined into a single one, any of the known methods for beam forming, adaptive nulling, or audio mixing, may be used. The selection of which audio streams to combine at any given moment may be performed by audio analysis or motion analysis or stereo analysis.

For example, the best audio source location may be selected according any of the above listed techniques. This may result in the selection of any one of (1) a single microphone, e.g. a microphone that is closest to the determined region of interest, or (2) the audio resulting from any of the known methods from adaptive beam-forming/null-steering using microphone arrays.

The combined media data generated by the data combiner 21 is a condensed, indexed version of the media data for a communication interaction. The combined media data may be recorded on a persistent storage device, e.g. disk. The stored, i.e. archived data enables subsequent browsing of the events that took place in the communication interaction. The system 10 may store a single video stream showing what was selected as the "best" views, consisting of spliced-together "best" video feeds at each moment of the communication interaction. The system 10 may store a single audio stream replaying what was selected as the "best" audio, consisting of spliced-together "best" audio data from each moment of the meeting. The system 10 may store a timeline index indicating who spoke when. This information may be derived from position and from known audio-based speaker identification methods. The system 10 may store a transcript of what was said during the communication interaction. This may be obtained by applying speech recognition software to the single archived audio record (described above) of the communication interaction. The system 10 may store a set of meeting highlights, each of which may contain audio, video, and other data, that compresses the events of the communication interaction into a shorter time while preserving the most important content. Many known methods for automatic video and/or audio summarization may be applied to the single archived video and/or audio streams described above.

The communication task 24 obtains the data pertaining to a particular interest thread from the sensing task 20 and transfers it to the rendering task 22 in a media data stream. In some embodiments, the communication task 24 employs network communication protocols, e.g. TCP/IP/UDP, HTTP, SOAP-XML, for communicating the media data stream as well as control data between the sensing task 20 and the rendering task 22.

The rendering task 22 obtains the media data stream for a particular interest thread via the communication task 24 and uses the selected rendering components for the particular interest thread to render the obtained media data stream. For example, the rendering task 22 may obtain visual data captured by a selected digital camera and then render the obtained visual data onto a selected visual display. Similarly, the rendering task 22 may obtain audio data captured by a selected microphone and then render the obtained audio data using a selected audio speaker.

In one embodiment, the interest thread detector 16 detects and keeps track of activities in the rich media environments 12-14 by creating and monitoring interest areas within the rich media environments 12-14. An interest area may be associated with an individual in one of the rich media environments 12-14. An interest area may be associated with an artifact in one of the rich media environments 12-14. An interest area may be associated with an area in one of the rich media environments 12-14. For example, the interest thread detector 16 may detect an artifact, e.g. using machine vision techniques, and the create an interest area for the detected artifact. In another example, the interest thread detector 16 may detect one or more individuals, e.g. using machine vision and/or audio processing techniques, and then create an interest area for the detected individuals.

The interest thread detector 16 may associate one or more of the interest areas with an interest thread. For example, the interest thread detector 16 may detect a set of individuals in an area of the rich media environment 12 and a set of individuals in an area of the rich media environment 13, create an interest area for each area, and then associate both interest areas with an interest thread for a communication interaction between the individuals detected in those area.

The system 10 in one embodiment includes an interest area tracker that tracks changes for the interest threads by tracking changes in the corresponding interest areas. For example, individuals may enter, leave, or changes positions in an interest area. The interest area tracker reports the interest area changes to the communication provider 18 so that the communication provider 18 can re-select sensing and rendering components for the corresponding interest thread as appropriate.

Figure 5:
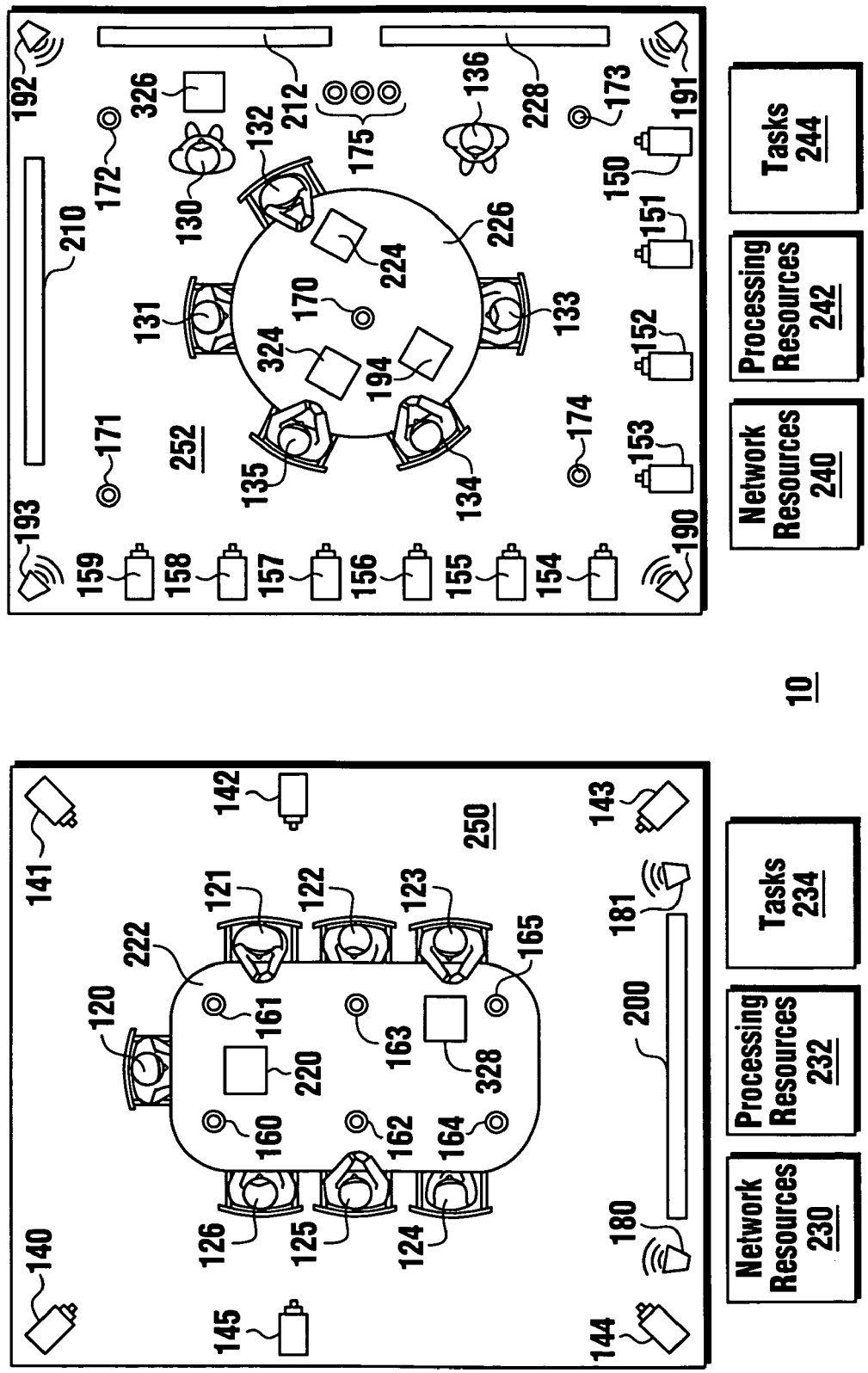
FIG. 5 shows an embodiment of the present system that includes a pair of example rich media environments.

FIG. 5 shows an embodiment of the system 10 that includes a pair of example rich media environments 250-252. The arrangements shown for the rich media environments 250-252 are only examples and numerous other arrangements are possible.

The rich media environment 250 has an arrangement of sensing and rendering components that includes a set of digital cameras 140-145, a set of microphones 160-165, a video display 200, and a pair of speakers 180-181. A set of individuals 120-126 are shown gathered around a conference table 222. An artifact 220, e.g. a sheet of paper, is shown on top of the conference table 222. The individual 123 has a handheld device 328, e.g. PDA, handheld computer, cell phone etc.

The rich media environment 252 has an arrangement of sensing and rendering components that includes a set of digital cameras 150-159, a set of microphones 170-174, a microphone array 175, a pair of video displays 210-212, and a set of speakers 190-194. A set of individuals 130-136 are shown along with a conference table 226. The individual 132 has a handheld device 224, the individual 130 has a handheld device 326 and the individual 135 has a handheld device 324. The rich media environment 252 includes a white board 228.

The rich media environment 250 is associated with a set of network resources 230, a set of processing resources 232, and a set of tasks 234. Similarly, the rich media environment 252 is associated with a set of network resources 240, a set of processing resources 242, and a set of tasks 244.

The network resources 230 and 240 and the processing resources 232 and 242 provide a platform for the interest thread detector 16 and the communication provider 18. The functions of the interest thread detector 16 and the communication provider 18 may be distributed among the network resources 230 and 240 and the processing resources 232 and 242 in any manner.

The network resources 230 and 240 may include one or more network signal paths, network interfaces, client and server hardware and software, etc. The network resources 230 and 240 may be embodied as client systems that communicate with an external server (not shown) or may be embodied as clients/servers with respect to one another.

The processing resources 232 and 242 may include processors, memory, computer-readable storage media that contains a set of code for execution, database storage, etc. The processing resources 232 and 242 may include specialized hardware/software for performing machine vision functions, audio processing, audio/video data compression/decompression, etc. The processing resources 232 and 242 may be distributed among a set of hardware devices including the sensing and rendering components of the rich media environments 250-252. For example, the digital cameras 140-145, 150-159 may include on-board processing resources for generating a media stream by performing mpeg encoding. Similarly, the video displays 200, 210-212 may include processing resources for performing mpeg decoding.

The processing resources 232 and 242 may include personal computers, laptops, handheld computers, etc., located in the rich media environments 250-252 and having the appropriate network communication capability. For example, the handheld device 224 may be included in the processing resources 242.

In addition, the handheld devices located in the rich media environments 250-252 and having the appropriate network communication capability may be used as sensing and/or rendering components. For example, the handheld device 224 may include sensing and rendering components that may be included with the sensing and rendering components of the rich media environment 252.

The tasks 234 and 244 provide a set of tasks that may be employed by the interest thread detector 16 and the communication provider 18. Examples of tasks include tasks for detecting artifacts and individuals using machine vision, tasks for detecting individuals using audio processing, tasks for detecting movements of individuals using machine vision and/or audio processing, tasks for obtaining stereoscopic visual information using camera arrays to name a few examples. The system 10 may include management components for deploying tasks onto the processing resources 232 and 242 as needed.

The tasks 234 may depend on the components and the processing resources of the rich media environment 250 and the tasks 244 may depend on the components and the processing resources of the rich media environment 250. For example, some audio processing tasks may require a microphone array which is available in the rich media environment 252 but not in the rich media environment 250.

The interest thread detector 16 may use the sensing components in the rich media environments 250-252 to detect formation of communication interactions among the individuals 120-126 and 130-136 and create an interest thread for a main interaction between the rich media environments 250-252. The main interaction may be initiated via user input to a graphical user interface to the interest thread detector 16. The rich media environments 250-252 may include user interface hardware, e.g. keypads, displays, handheld devices, etc., for that purpose. The communication provider 18 selects a subset of the sensing and rendering components in the rich media environments 250-252 for use the main interaction based on the coverage areas of those components and the positions of the individuals 120-126 and 130-136 within the rich media environments 250-252. For example, the communication provider 18 may select the digital cameras 143-144, the microphones 160-165, the speakers 180-181 and the video display 200 in the rich media environment 250 and the digital cameras 152, 157, the microphone 170, the speakers 190-191, and the video displays 210-212 in the rich media environment 252 for the main interaction.

The interest thread detector 16 may detect a side conversation from a gesture by one of the individuals 120-126 and 130-136. For example, the interest thread detector 16 may detect a gesture, e.g. leaning over or pointing to, by the individual 132 toward the individual 135 and create an interest thread for that side conversation. The communication provider 18 may select the handheld device 224 and the handheld device 324 for use with that interest thread. The handheld device 324, e.g. a PDA, cell phone, laptop, etc., may provide any combination of audio rendering, video rendering, audio sensing, and video sensing capabilities. For example, the handheld device 324 may be a device that is capable of sending a media stream in a phone call to the sensing task 20 and/or capable of receiving a media stream in a phone call from the rendering task 22.

In another example, the interest thread detector 16 may detect a gesture by the individual 130 who points and area of the video display 212 that has an image of the individual 123 and create an interest thread for a side conversation between the individuals 130 and 123. The communication provider 18 may select the digital camera 150, the microphone 172, the handheld device 326, the digital camera 144, the microphone 165, and the handheld device 328 for use with that interest thread.

If a sensing device, e.g. the microphone 165 is shared by the main interaction and a side conversation then the communication provider 18 employs audio processing techniques to extract the data pertaining to each interest thread and then routes the extracted data appropriately. For example, data extracted from the microphone 165 that pertains to the main conversation is routed to the speakers 190-191 and data extracted from the microphone 165 that pertains to the side conversation is routed to the handheld device 326.

The communication provider 18 re-selects of the sensing and rendering components for the interest threads for the main and side conversations in response to movements of the individuals involved. For example, the communication provider 18 may, for the interest thread of the side conversation involving the individuals 130 and 123, select the digital camera 151 and release the digital camera 150 if a movement causes the individual 130 to be no longer in the coverage area of the digital camera 150. In another example, the communication provider 18, for the interest thread of the main conversation, may select the digital camera 140 if the speaker involved in the main conversation moves out of the coverage areas of the digital cameras 143 and 144.

The interest thread detector 16 may detect the paper 220 as an artifact using machine vision techniques. For example, the rich media environment 250 may include a digital camera that has a top view of the table 222 that enables a pattern recognition of the paper 220. The interest thread detector 16 may create an interest area pertaining to the paper 220 and track that interest area over time. The interest area associated with the paper 220 may be associated with an interest thread.

The interest thread detector 16 may use machine vision techniques to detect a drawing, i.e. an artifact, imparted by the individual 136 onto the white board 228. For example, the digital cameras 155-156 may be capable of sampling the image content on the white board 228. The interest thread detector 16 may create an interest area pertaining to the white board 228 and track that interest area over time. The interest area associated with the white board 228 may be associated with an interest thread. For example, the contents of the white board 228 may be sampled and then rendered onto the video display 200 as part of an interest thread.

The interest thread detector 16 may detect the paper 220 as an artifact using machine vision techniques. For example, the rich media environment 250 may include a digital camera that has a top view of the table 222 that enables a pattern recognition of the paper 220. The interest thread detector 16 may create an interest area pertaining to the paper 220 and track that interest area over time. The interest area associated with the paper 220 may be associated with an interest thread.

The interest thread detector 16 may use machine vision techniques to detect a drawing area, i.e. a shared artifact. For example, the digital cameras 155-156 may be capable of sampling the image content on the white board 228. The interest thread detector 16 may create an interest area pertaining to the white board 228 and track that interest area over time. The interest area associated with the white board 228 may be associated with an interest thread. For example, the contents of the white board 228 may be sampled and then rendered onto the video display 200 as part of an interest thread.

The system 10 enables a communication interaction among multiple individuals that collaborate on a shared artifact the view of which may change over time. One example of such a shared artifact is a shared virtual writing surface, e.g. a virtual whiteboard or a virtual notepad. For example, individuals may use items such as a pad of paper and a writing instrument and the system 10 uses computer vision methods to sense the writing surfaces. The obtained data from sensing writing surfaces are then rendered for the appropriate individuals to view via one or more display surfaces. The data from each individual and the resulting composite virtual whiteboard may be recorded.

A communication interaction involving a virtual white board may include individuals located in the same rich media environment or in different rich media environments. Two or more writing surfaces may be used as input to the shared virtual whiteboard. All of the writings of all individuals are discovered by cameras in the rich media environment and are rendered to the appropriate rendering devices for viewing by the individuals. These displays are preferably overlaid upon and aligned with one or more of the original input writing surfaces, via use of digital projectors. Other types of display surfaces, such as plasma, laptop, computer, or tablet computer displays may also be used.

The system 10 may store the current shared whiteboard contents along with a history of the changes made to the shared whiteboard contents over time. This history may be stored as a series of time-stamped or time-ordered images showing the state of the shared whiteboard contents at different times during the collaboration session. The history enables an undoing the most recent one or more changes made to a whiteboard. The history also enables the replacing the contents of a currently displayed whiteboard with an image of the whiteboard at an earlier time. The history also enables the displaying of which marks were made by which individuals. The history also enables a replaying of a collaboration session. The history enables users to interactively seek to a specific time-point in the past.

Figure 6:
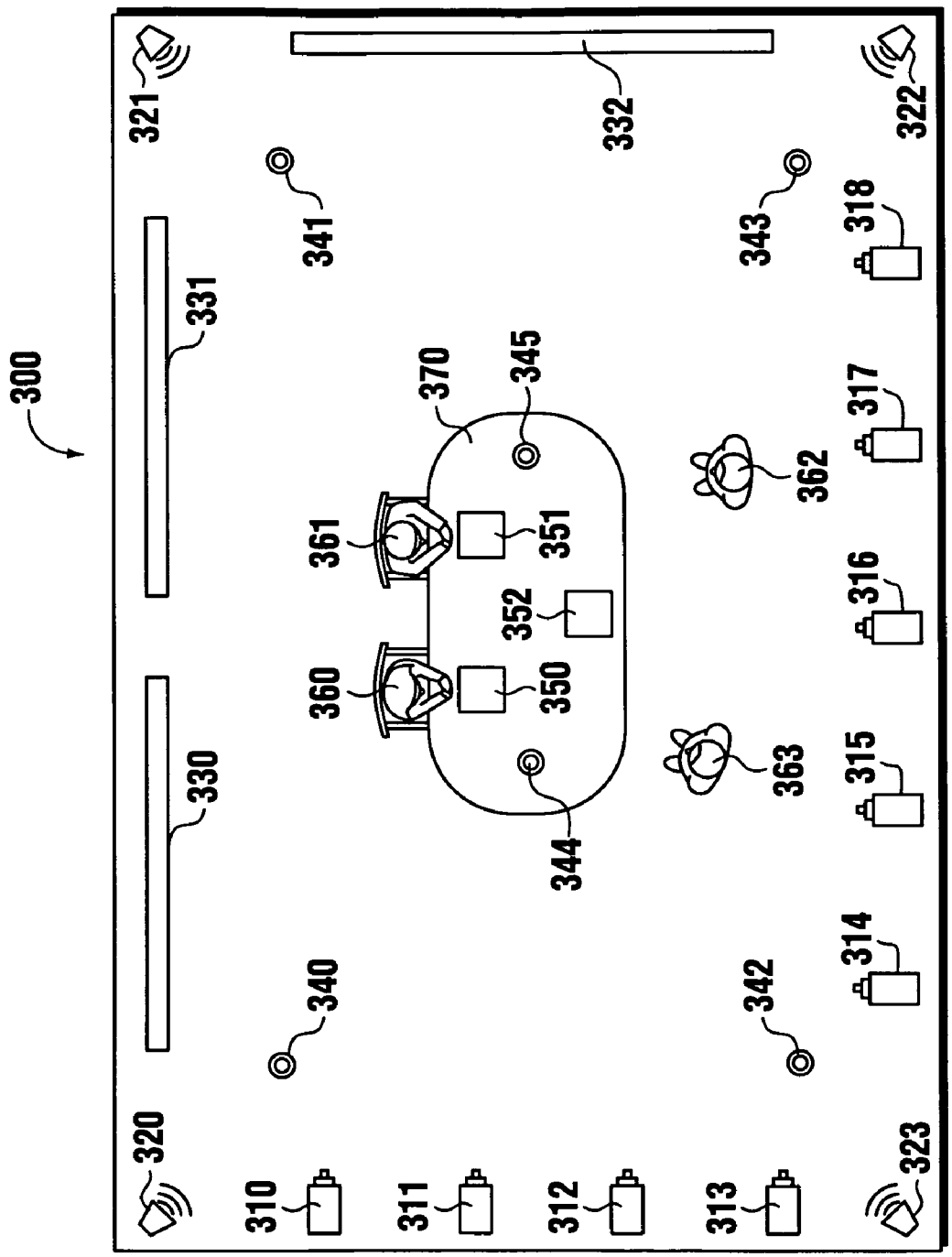
FIG. 6 shows a rich media environment according to the present teachings.

FIG. 6 shows a rich media environment 300 according to the present teachings. The rich media environment 300 includes an arrangement of sensing and rendering components including a set of digital cameras 310-318, a set of audio speakers 320-323, a set of microphones 340-345, and a set of video displays 330-332. The rich media environment also includes a set of portable devices 350-352, e.g. cell phone, PDA, laptop, etc., any one or more of which may include sensing and or rendering components. For example, a portable device may include any combination of a digital camera, a microphone, a speaker, a video display, etc.

The rich media environment 300 is used by a set of individuals 360-363. The rich media environment 300 may be embodied as a conference room, e.g. a conference table 370, a meeting room, a laboratory, etc., or any type of venue. The rich media environment 300 preferably includes a relatively large number of sensing and rendering components, thereby enabling flexible deployment of sensing and rendering components for performing tasks and services.

The rich media environment 300 is associated with a set of processing resources and a set of networking resources. Examples of processing resources include computational devices, e.g. computers, specialized processing devices, as well as memory and storage devices. Examples of networking resources include servers, network communication devices, networking lines, client devices, etc. Some of the processing and networking resources may be included with the sensing and rendering components. For example, the digital cameras 310-318 may include on-board network cards and/or onboard mpeg encoders. Similarly, the video displays 330-332 include on-board network cards and/or onboard mpeg decoders. In addition, the portable devices 350-352 may provide processing resources and/or networking resources for use with the rich media environment 300.

Figure 7:
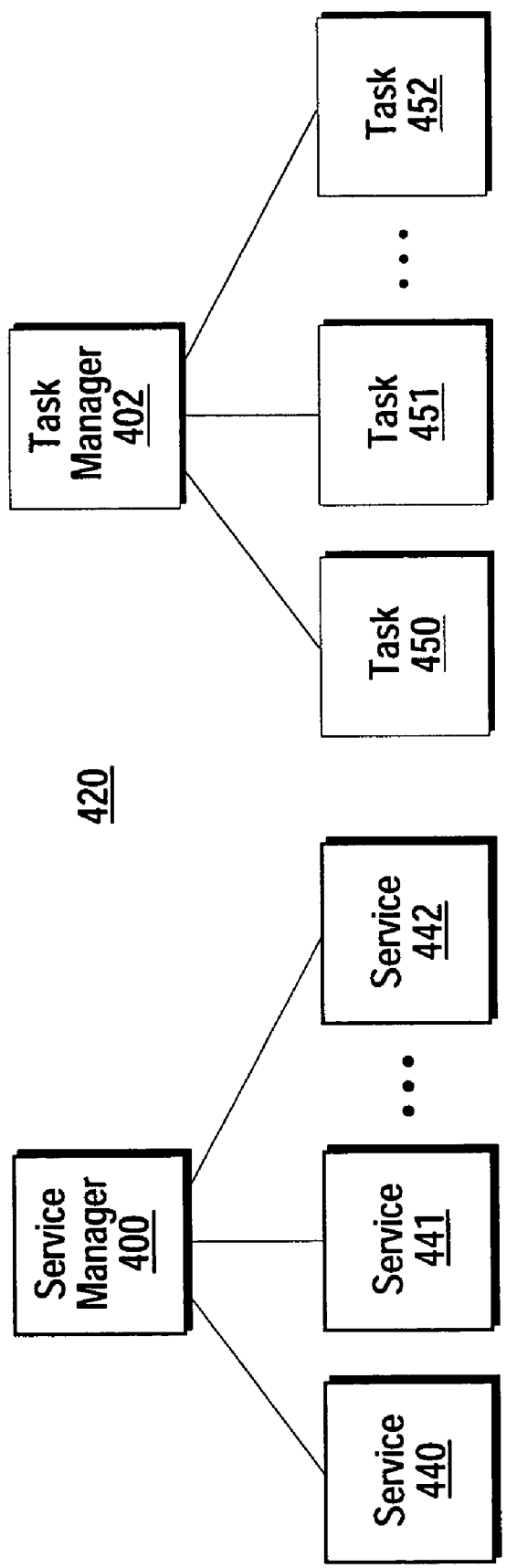
FIG. 7 shows a service manager and a task manager in a management system according to the present teachings.

FIG. 7 shows a service manager 400 and a task manager 402 in a management system 420 according to the present teachings. The service manager 400 provides a set of communication services 440-442 pertaining to the rich media environment 300 and the task manager 402 performs a set of tasks 450-452 that support the communication services 440-442.

The task manager 402 maintains a list of the tasks 450-452 that may be performed in the rich media environment 300. The list may be based on the arrangement of sensing and rendering components in the rich media environment 300 and the available processing and communication resources and the installed software. The list of available tasks may be generated during a setup/configuration procedure for the rich media environment 300.

One example of a task that may be performed by the task manager 402 is a task for finding an individual in the rich media environment 300. The task of finding an individual may be performed by recognizing the individual using machine vision. The availability of the task of visual recognition may depend on the availability of digital cameras and processing and networking resources and software for obtaining an image of an individual from a digital camera and comparing the obtained image to stored images of known individuals. The task of finding an individual may be performed by voice recognition. The availability of a voice recognition task may depend on the availability of microphones and processing and networking resources and software for obtaining a speech sample of an individual and comparing the obtained speech sample to stored speech samples of known individuals.

Another example of a task that may be performed by the task manager 402 is a task for tracking the movements of an individual. The task of tracking an individual may be performed using machine vision or audio processing techniques.

Another example of a task that may be performed by the task manager 402 is a task for detecting a gesture of an individual. The task of detecting a gesture may be performed using machine vision techniques.

Another example of a task that may be performed by the task manager 402 is a task for performing voice recognition. Yet another example of a task that may be performed by the task manager 402 is a task for performing speech recognition.

Another example of a task that may be performed by the task manager 402 is a task for obtaining a set of sensor data from a location in the rich media environment 300. The sensor data may be audio data from the microphones 340-345 and/or video data from the digital cameras 310-318 and/or audio and/or video data from the portable devices 350-352.

Yet another example of a task that may be performed by the task manager 402 is a task for rendering a set of data to a location in the rich media environment 300. The data may be audio data to be rendered using the audio speakers 320-323 and/or video data to be rendered using the video displays 330-332 and/or the portable devices 350-352.

Another example of a task that may be performed by the task manager 402 is a task for generating a 3D model of the rich media environment 300. The availability of this task may depend on the availability of a properly arranged array of digital cameras and processing and networking resources and software for obtaining stereoscopic images and constructing a 3D representation of the obtained images.

The service manager 400 uses the task manager 402 to perform the appropriate tasks required by each communication service 440-442. The service manager 400 sends a request to the task manager 402 to perform a desired task and task manager 402 allocates a set of processing resources and communication resources to the requested task and performs the requested task.

One example of a communication service provided by the service manager 400 is a service for tracking the movement of each of a set of individuals in the rich media environment 300. For example, the service manager 400 may provide a service to track movements of the individuals 360-361 by requesting from the task manager 402 a task to locate the individual 360 and a task to track the movements of the individual 360 and a task to locate the individual 361 and a task to track the movements of the individual 361. The outputs of the two locate tasks may serve as inputs to the two tracking tasks.

Another example of a communication service provided by the service manager 400 is a service for providing a communication channel to a set of individuals in the rich media environment 300. For example, the service manager 400 may provide a service for a communication channel between the individuals 360-361 by requesting from the task manager 402 a task to locate the individual 360 and a task to obtain sensor data from the individual 360 and a task to render data to the individual 360 and a task to locate the individual 361 and a task to obtain sensor data from the individual 361 and a task to render data to the individual 361. The sensor data obtained from the individual 360 may be used as data to be rendered to the individual 361 and vice versa. The sensing and rendering components to be used by these tasks may be selected in response to a current location of each of the individuals 360-361 and the coverage areas and other duties of the sensing and rendering components. The service manager 400 may also request tasks for tracking movements of the individuals 360-361 so the sensing and rendering components for the communication channel may be updated as the need arises.

Figure 8:
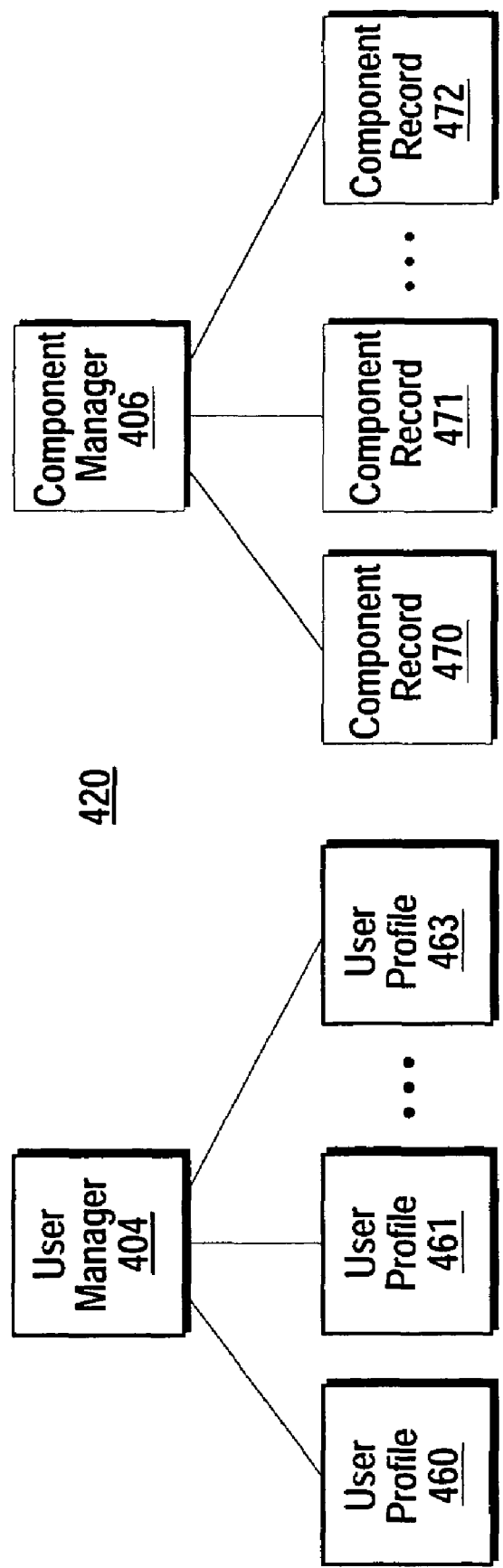
FIG. 8 shows a user manager and a component manager in a management system according to the present teachings.

FIG. 8 shows a user manager 404 and a component manager 406 in the management system 420. The user manager 404 manages communication and collaboration among the individuals 360-363 in the rich media environment 300 and the component manager 406 manages the components of the rich media environment 300 including its sensing and rendering components, processing resources, storage resources, network resources, as well as its portable devices.

The user manager 404 maintains a set of user profiles 460-463 for the respective individuals 360-363. For example, the profile 460 for the individual 360 may include the current location of the individual 360 within the rich media environment 300. The profile 460 may include a set of attributes pertaining to the individual 360. A set of attributes of an individual may have meaning in the context of a meeting underway involving the rich media environment 300. For example, the attributes may specify a qualification or area of expertise of the individual. The attributes may be used in forming communication interactions among the individuals 360-363 and individuals in other rich media environments or remote sites, e.g. remote users having handheld devices, cell phones, etc. For example, communication interactions may be formed among individuals on the basis of their expertise, rank, organizational factors, etc.

The user manager 404 provides a graphical user interface view of the profiles 460-463 of the individuals 360-363. The user manager 404 may also provide a graphical user interface view of the individuals associated with other rich media environments that have communication interactions underway with the individuals 360-363 in the rich media environment 300.

The user manager 404 identifies the individuals 360-363 as they enter the rich media environment 300. For example, the rich media environment 300 may include a graphical user interface, e.g. keyboard/keypad, display, etc., that enables an individual provide identification information upon entry to the rich media environment 300. The user manager 404 may employ the sensing and rendering components in the rich media environment 300 for a graphical user interface. The rich media environment 300 may include a barcode detector, magnetic code detector, etc., that obtains identification information pertaining an individual upon entry to the rich media environment 300. The identification information for an individual may be stored in the user profile of the individual.

The user manager 404 may identify the individuals 360-363 using the services provided by the service manager 400, e.g. image or voice recognition. The user manager 404 tracks the locations of the individuals 360-363 within the rich media environment 300 over time using the services provided by the service manager 400. The locations of the individuals 360-363 may be used in forming communication interactions among the individuals 360-363 and individuals in other rich media environments or remote sites and in selecting sensing and rendering components for use with the communication interactions.

The user manager 404 keeps track of the portable devices 350-352 within the rich media environment 300. For example, each portable device 350-352 may be associated with an individuals and be registered in the user profiles of the individuals.

The component manager 406 maintains a set of component records 470-472. The component records 470-472 include a record for each sensing and rendering component of the rich media environment 300. A component record for a sensing or rendering component may specify its location in the rich media environment 300 and a coverage area, as well as any other pertinent information, e.g. part of an array or an array of components. A component record for a sensing or rendering component may specify any interest threads and/or interest areas to which the sensing component is currently allocated.

The component records 470-472 include a component record for each processing resource, storage resource, and network resource associated with the rich media environment 300. A component record for a processing resource, a storage resource, or a network resource may specify its availability or available capacity based on the tasks it is currently performing.

The component records 470-472 include a component record for each component of the portable devices 350-352 that may be employed in the rich media environment 300. A component record for a portable device may specify an individual to which it is associated and/or processing capability that it may possess and that may be used by the management system 420.

Figure 9:
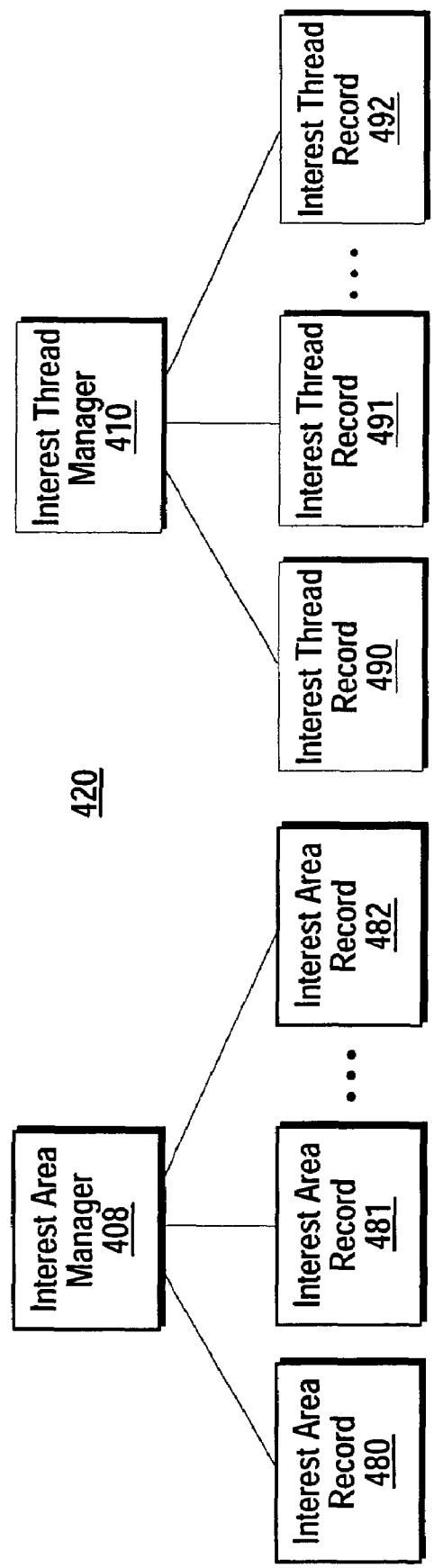
FIG. 9 shows an interest area manager and an interest thread manager in a management system according to the present teachings.

FIG. 9 shows an interest area manager 408 and an interest thread manager 410 in the management system 420. The interest area manager 408 manages a set of interest areas in the rich media environment 300 and the interest thread manager 410 manages a set of interest threads that pertain to the rich media environment 300.

The interest area manager 408 identifies interest areas in the rich media environment 300. An interest area may be associated with an individual in the rich media environment 300 or an artifact in the rich media environment 300 or a sub-area within the rich media environment 300. The interest area manager 408 may identify an interest area by identifying one or more individuals or an artifact in the rich media environment 300, e.g. using the services 440-442. The interest area manager 408 may identify a set of interest areas by subdividing the rich media environment 300 into a set of sub-areas and creating an interest area for each sub-area.

The interest area manager 408 creates a set of interest area records 480-482 each for an identified interest area. Each interest area record 480-482 includes an identification and the locations of the individuals included in the corresponding interest area. The interest area manager 408 selects the sensing and rendering components of the rich media environment 300 that are to be used for each interest area and identifies the selected components in the interest area records 480-482.

The interest area manager 408 tracks each interest area over time and detects the movements of the individuals or artifacts associated with the interest areas using the services 440-442. The interest area manager 408 records the movements in the interest area records 480-482 and the information may be used to re-select sensing and rendering components to provide proper coverage for the interest areas.

The interest area manager 408 may obtain a list of desired target rendering requests from the interest thread manager 410 and then determine the sensing and rendering components needed to capture an interest area for target viewers. For example, a target rendering request may request video or audio of a particular individual or of an artifact or may request a particular perspective view of an individual or artifact in one of the interest areas.

The interest thread manager 410 uses the sensing components in the rich media environment 300 to detect formation of communication interactions among the individuals 360-363 and individuals in other rich media environments or remotely located individuals. The interest thread manager 410 creates a set of interest thread records 490-492 each for detected communication interaction. The interest thread manager 410 may detect formation of a communication interaction by using the services 440-442 to detect a visual cue, e.g. a gesture, a movement, etc., by one of one or more individuals 360-363. The interest thread manager 410 may detect formation of a communication interaction by using the services 440-442 to detect spoken speech cues by the individuals 360-363. The interest thread manager 410 may create an interest thread in response to user input via a graphical user interface.

The interest thread manager 410 may track changes in an interest thread via the interest area manager 408 and record the changes in the interest thread records 490-492. For example, interest thread manager 410 may associate an interest thread with one or more interest areas that are tracked by the interest area manager 408 so that changes in an interest thread depend on changes in its underlying interest areas.

The interest thread manager 410 manages ongoing interest threads associated with the rich media environment 300. For example, the interest thread manager 410 obtains information pertaining to the movements of the individuals involved in the ongoing interest threads. The interest thread manager 410 may use this information to detect new individuals involved in an ongoing interest thread and individuals that leave an ongoing interest thread. The interest thread manager 410 may use this information to detect merging of ongoing interest threads and splitting of ongoing interest threads. For example, movements of the individuals involved in a first interest thread toward the individuals involved in a second interest thread may indicate merging of the first and second interest threads. Similarly, movements of the individuals involved in the first interest thread away from the individuals involved in the second interest thread may indicate splitting of the first and second interest threads. The interest thread manager 410 may close an interest thread if it is inactive for a predetermined period of time or if all of the individuals involved physically or virtually move away from one another.

Figure 10:
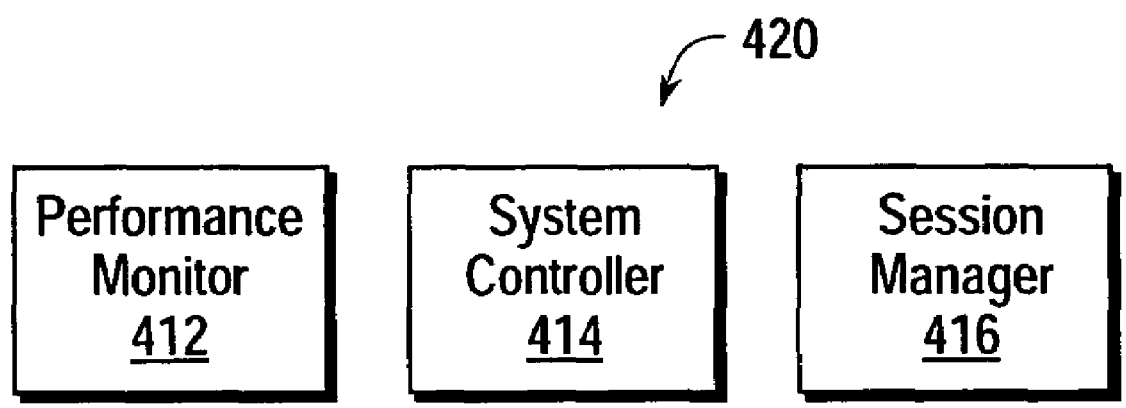
FIG. 10 shows a performance monitor, a system controller, and a session manger in a management system according to the present teachings.

FIG. 10 shows a performance monitor 412, a system controller 414, and a session manger 416 in the management system 420. The performance monitor 412 provides a graphical user interface for monitoring system performance. The performance monitor 412 generates a set of views of the system including a user view of the system, an interest area view of the system, an interest thread view of the system, a component view of the system, a task manager view of the system, and a service view of the system.

The system controller 414 enables operator control over portions of the system. The system controller 414 generates a graphical user interface that shows system performance and system status. The system controller 414 enables an operator to manually specify interest areas in the rich media environment 300 and to adapt interest areas and interest threads. The system controller 414 enables an operator to manually control the components of the rich media environment 300 that are used in interest areas and interest threads.

The session manager 416 creates sessions between the management system 420 and a management system for another rich media environment.

The tasks for tracking movements of individuals may be implemented as vision-based person tracking systems. A person tracking system may detect and track individuals based on passive observation of an area. A person tracking system may detect and track individuals based upon plan-view imagery that is derived at least in part from video streams of depth images representative of the visual scene in the area. A person tracking system may generate a three-dimensional mesh or point cloud. The three-dimensional point cloud has members with one or more associated attributes obtained from the video streams and represents selected depth image pixels in a three-dimensional coordinate system spanned by a ground plane and a vertical axis orthogonal to the ground plane. The three-dimensional point cloud is partitioned into a set of vertically-oriented bins. The partitioned three-dimensional point cloud is mapped into a plan-view image containing for each vertically-oriented bin a corresponding pixel having one or more values computed based upon one or more attributes or a count of the three-dimensional point cloud members occupying the corresponding vertically-oriented bin. The object is tracked based at least in part upon the plan-view image. A three-dimensional mesh is a three-dimensional point cloud with explicit continuity.

An interest thread is a dynamic entity that may be viewed as having lifetime from creation of the interest thread to possibly one or more modifications to the interest thread to destruction of the interest thread. A modifications to an interest thread may occur as objects/individuals leave the corresponding communication interaction. For example if an individual leaves a group conversation then the corresponding interest thread continues as modified. The remaining individuals involved in a modified interest thread may be notified of thread modification events.

Interest threads may merge and branch. A merge is the combination of two or more pre-existing interest threads into one interest thread. A branching is the splitting of one interest thread into two or more interest threads. Interest threads may also move among rich media environments.

The user profiles may also include permission profiles. A permission profile may pertain to an interest thread or to an object or an individual. A thread permission may be used to make a thread private, public or restricted for subscriptions to a group. Thread permission may control whether or not any individual in the rich media environment is notified of the existence and activity pertaining to the interest thread. At the start of an interest thread it may be designated as an exclusive thread and that no one has permissions to tune in. The speaker at a conference may start an interest thread and allow everyone to tune in.

User permissions enable a user to keep their actions and presence from being detected. An interest thread detector cannot monitor the attributes or actions of such individual.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A system for communication, comprising:
   first set of sensing and rendering components arranged to cover physical movements of multiple individuals present in a first environment;
   second set of sensing and rendering components arranged to cover physical movements of multiple individuals present in a second environment;
   interest thread detector that uses the first and second set of sensing and rendering components to detect multiple communication interactions each involving a respective subset of the individuals present in the first and second environments and that maintains an interest thread for each communication interaction;
   communication provider that captures a set of media data from the sensing components and that combines the captured media data in response to the respective activities indicated by physical movements of each subset of the individuals and that communicates the combined media data to the rendering components, wherein the communication provider includes a user manager configured to maintain a set of user profiles for the respective individuals, the user profiles including permission profiles having thread permissions and user permissions configured to enable an individual to keep their actions and presence from being detected by the interest thread detector.

2. The system of claim 1, wherein the communication provider selects a respective subset of the first and second set of sensing and rendering components for use for each interest thread.

3. The system of claim 1, wherein the respective activities include speech levels of the individuals involved in the respective interest thread.

4. The system of claim 1, wherein the respective activities include gestures by the individuals involved in the respective interest thread.

5. The system of claim 1, wherein the respective activities include movements by the individuals involved in the respective interest thread.

6. The system of claim 1, wherein the respective activities include locations of the individuals involved in the respective interest thread.

7. The system of claim 1, wherein the communication provider refines the media data obtained from the sensor components in response to the respective activities.

8. The system of claim 1, wherein the communication provider stores the combined media data to provide a history of each communication interaction.

9. The system of claim 1, wherein the communication interactions include a communication interaction that pertains to an artifact in one of the environments.

10. The system of claim 9, wherein the artifact changes over time.

11. The system of claim 10, wherein a change to the artifact is made by one of the individuals involved in the interest threads.

12. The system of claim 10, wherein the communication provider records a history of the artifact over time.

13. The system of claim 9, wherein the artifact is a shared virtual writing surface.

14. The system of claim 1, wherein the interest thread detector detects one or more activities in the environments and creates an interest area for the detected activity.

15. The system of claim 14, wherein the interest thread detector associates the interest area with another interest thread.

16. The system of claim 1, wherein the communication interactions include a communication interaction that involves two or more of the individuals in one of the environments.

17. The system of claim 1, wherein the communication interactions include a communication interaction that involves one or more of the individuals in two of the environments.

18. The system of claim 1, wherein the interest thread detector detects formation by detecting a movement of one of the individuals.

19. The system of claim 18, wherein the movement pertains to one of the rendering devices.

20. The system of claim 18, wherein the movement pertains to one of the other individuals.

21. The system of claim 1, wherein one or more of the individuals is in a remote location and in possession of a remote sensing and rendering component.

22. A method for communication, comprising:
providing a first set of sensing and rendering components for covering physical movements of multiple individuals present in a first environment;
providing a second set of sensing and rendering components for covering physical movements of multiple individuals present in a second environment;
detecting multiple communication interactions each a communication interaction involving a respective subset of the individuals present in the first and second environments;
maintaining an interest thread for the each detected communication interaction;
maintaining a set of user profiles for each of the individuals
capturing a set of media data from the sensing components;
combining the captured media data in response to the respective activities indicated by physical movements of the respective subset of the individuals;
communicating the combined media data to the rendering components, including communicating the user profile for each of the individuals, each user profile including a permission profile having a thread permission and a user permission configured to enable an individual to keep their actions and presence from being detected by the interest thread detector.

23. The method of claim 22, further comprising selecting a respective subset of the sensing and rendering components for use for each interest thread.

24. The method of claim 22, wherein combining the captured media data includes detecting speech levels of the corresponding individuals.

25. The method of claim 22, wherein combining the captured media data includes detecting gestures by the corresponding individuals.

26. The method of claim 22, wherein combining the captured media data includes detecting movements by the corresponding individuals.

27. The method of claim 22, wherein combining the captured media data includes detecting locations of the corresponding individuals.

28. The method of claim 22, further comprising refining the media data obtained from the sensor components in response to the respective activities.

29. The method of claim 22, further comprising storing the combined media data in a history of each communication interaction.

30. The method of claim 22, further comprising monitoring an artifact over time.

31. The method of claim 30, further comprising recording a history of the artifact over time.

32. The method of claim 22, further comprising detecting one or more activities in the environments and creating an interest area for each detected activity.

33. The method of claim 32, further comprising associating the interest area with another interest thread.

34. A computer-readable storage media that contains a set of code that when executed provides communication by:
providing a first set of sensing and rendering components for covering physical movements of multiple individuals present in a first environment;
providing a second set of sensing and rendering components for covering physical movements of multiple individuals present in a second environment;
detecting multiple communication interactions each involving a respective subset of the individuals present in the first and second environments;
maintaining an interest thread for each detected communication interaction;
maintaining a set of user profiles for each of the individuals;
capturing a set of media data from the sensing components;
combining the captured media data in response to the respective activities indicated by physical movements of the respective subset of the individuals;
communicating the combined media data to the rendering components, including communicating a user profile for each of the individuals, each user profile including a permission profile having a thread permission and a user permission configured to enable an individual to keep their actions and presence from being detected by the interest thread detector.

35. The computer-readable storage media of claim 34, further comprising selecting a respective subset of the sensing and rendering components for use for each interest thread.

36. The computer-readable storage media of claim 34, wherein combining the captured media data includes detecting speech levels of the corresponding individuals.

37. The computer-readable storage media of claim 34, wherein combining the captured media data includes detecting gestures by the corresponding individuals.

38. The computer-readable storage media of claim 34, wherein combining the captured media data includes detecting movements by the corresponding individuals.

39. The computer-readable storage media of claim 34, wherein combining the captured media data includes detecting locations of the corresponding individuals.

40. The computer-readable storage media of claim 34, further comprising refining the media data obtained from the sensor components in response to the respective activities.

41. The computer-readable storage media of claim 34, further comprising storing the combined media data in a history of each communication interaction.

42. The computer-readable storage media of claim 34, further comprising monitoring an artifact over time.

43. The computer-readable storage media of claim 42, further comprising recording a history of the artifact over time.

44. The computer-readable storage media of claim 34, further comprising detecting one or more activities in the environments and creating an interest area for each detected activity.

45. The computer-readable storage media of claim 44, further comprising associating the interest area with another interest thread.

\* \* \* \* \*

UNITED STATES PATENT AND TRADEMARK OFFICE
CERTIFICATE OF CORRECTION

PATENT NO. : 7,590,941 B2  Page 1 of 1
APPLICATION NO. : 10/682542
DATED : September 15, 2009
INVENTOR(S) : Susie J. Wee et al.

It is certified that error appears in the above-identified patent and that said Letters Patent is hereby corrected as shown below:

In column 17, line 40, in Claim 22, after "individuals" insert -- ; --.

Signed and Sealed this

Twenty-eighth Day of September, 2010

David J. Kappos
*Director of the United States Patent and Trademark Office*